United States Patent
Senoo et al.

(10) Patent No.: US 12,256,749 B2
(45) Date of Patent: Mar. 25, 2025

(54) MANUFACTURING METHOD FOR HEN'S EGG IMPROVED IN QUALITY

(71) Applicant: FUJIWARA TECHNO-ART CO., LTD., Okayama (JP)

(72) Inventors: Satoko Senoo, Okayama (JP); Natsuki Fukano, Okayama (JP); Miyabi Morino, Okayama (JP); Yuma Fukuda, Okayama (JP); Ayano Nakayama, Okayama (JP); Satoru Ariyasu, Okayama (JP); Yuma Nakanishi, Okayama (JP); Yoshino Mitsuda, Okayama (JP); Mio Morimoto, Okayama (JP); Maho Otsuki, Okayama (JP); Toru Fujii, Okayama (JP)

(73) Assignee: FUJIWARA TECHNO-ART CO., LTD., Okayama (JP)

( * ) Notice: Subject to any disclaimer, the term of this patent is extended or adjusted under 35 U.S.C. 154(b) by 229 days.

(21) Appl. No.: 17/016,767

(22) Filed: Sep. 10, 2020

(65) Prior Publication Data
US 2022/0053785 A1 Feb. 24, 2022

(30) Foreign Application Priority Data
Aug. 18, 2020 (JP) .................. 2020-137848

(51) Int. Cl.
*A23B 5/14* (2006.01)
(52) U.S. Cl.
CPC ...................... *A23B 5/14* (2013.01)
(58) Field of Classification Search
CPC ...................................... A23B 5/14
USPC ........................ 426/330, 1, 330.1
See application file for complete search history.

(56) References Cited

U.S. PATENT DOCUMENTS

2014/0037582 A1* 2/2014 Romero .............. A61P 1/14
424/93.1
2021/0071154 A1 3/2021 Fujiwara

FOREIGN PATENT DOCUMENTS

| JP | 2002238466 A | 8/2002 |
| JP | 2003-325110 A | 11/2003 |

OTHER PUBLICATIONS

Miles et al., Influence of Fermacto on the Performance of Laying Hens when Fed Diets with Different Levels of Methionine, 1988 Poultry Science 67:842-844 (Miles).*
Pirsaraei, Effects of dietary supplementation of Aspergillus originated prebiotic (Fermacto) on performance and small intestinal morphology of broiler chickens fed diluted diets, Italian Journal of Animal Science 2010; vol. 9:e12 (Pisaraei).*
Saleh et al., Effect of Aspergillus Niger on Broilers Performance, Egypt Poultyr Science, 2010 (30) (IV) (1017-1029) (Saleh).*
Choct, Feed Polysaccharides: Nutritional Roles and Effect of Enzymes, Poultry Industry, 2011 accessed at https://en.engormix.com/poultry-industry/articles/feed-enzymes-in-poultry-nutrition-t34747.htm (Choct).*

* cited by examiner

*Primary Examiner* — Nikki H. Dees
*Assistant Examiner* — Philip A Dubois
(74) *Attorney, Agent, or Firm* — Rankin, Hill & Clark LLP

(57) ABSTRACT

Provided is a method for producing hen's egg improved in quality includes feeding a solid-cultured product of filamentous fungi blended with feedstuff of a hen or the solid-cultured product of the filamentous fungi alone to a hen to improve quality of the hen's egg, in which at least one quality among improvement in yolk color, improvement in eggshell strength, increase in an egg white height, increase in an eggshell thickness, increase in an egg weight, increase in a Haugh unit, increase in an egg production ratio, and reduction in a generation ratio of an abnormal egg is improved for hen's egg that the hen ingesting the solid-cultured product of the filamentous fungi produce.

5 Claims, No Drawings

MANUFACTURING METHOD FOR HEN'S EGG IMPROVED IN QUALITY

FIELD

The present invention relates to a method for producing hen's egg improved in quality.

BACKGROUND

Patent Literature 1 has described a method for drying and pulverizing a culture product obtained by inoculating benikoji (*Monascus pilosus*, a mutant strain of IFO4520) on steamed rice to produce a powder. Patent Literature 1 has described that ingestion of this powder to a laying hen causes reduction in cholesterol content contained in yolk.

CITATION LIST

Patent Literature

Patent Literature 1: Japanese Patent Application Laid-open No. 2003-325110

SUMMARY

Technical Problem

The powder described in Patent Literature 1 improves the quality of hen's egg in that the powder reduces the cholesterol content contained in yolk. However, Patent Literature 1 has not described that the powder provides an effect for improving yolk color, an effect for improving eggshell strength, an effect for increasing an egg white height, an effect for increasing an eggshell thickness, an effect for increasing an egg weight, an effect for increasing a Haugh unit, an effect for increasing an egg production ratio, or an effect for reducing the generation ratio of an abnormal egg.

An object of the present disclosure is to provide a method for producing hen's egg in which at least one quality among the effect for improving yolk color, the effect for improving eggshell strength, the effect for increasing an egg white height, the effect for increasing an eggshell thickness, the effect for increasing an egg weight, the effect for increasing a Haugh unit, the effect for increasing an egg production ratio, and the effect for reducing the generation ratio of an abnormal egg is improved.

Solution to Problem

The above-described problem is solved by a method for producing hen's egg improved in quality, the method including: feeding a solid-cultured product of filamentous fungi blended with feedstuff of a hen or the solid-cultured product of the filamentous fungi alone to a hen to improve quality of the hen's egg, wherein at least one quality among improvement in yolk color, improvement in eggshell strength, increase in an egg white height, increase in an eggshell thickness, increase in an egg weight, increase in a Haugh unit, increase in an egg production ratio, and reduction in a generation ratio of an abnormal egg is improved for the hen's egg that the hen ingesting the solid-cultured product of the filamentous fungi produce.

The filamentous fungi are preferably fungi not producing mold poison. The fungi not producing the mold poison are preferably *Aspergillus oryzae, Aspergillus sojae*, or *Aspergillus luchuensis* that does not produce mold poison. The solid-cultured product of the filamentous fungi preferably includes polysaccharides constituting hyphae of the filamentous fungi. The solid-cultured product of the filamentous fungi preferably includes an enzyme having activity. The solid-cultured product of the filamentous fungi preferably includes viable fungi of the filamentous fungi. In the method for producing hen's egg improved in quality, the blend ratio of the solid-cultured product of the filamentous fungi with the feedstuff is preferably 0.1% by mass to 5.0% by mass, in the case where the solid-cultured product of the filamentous fungi is blended with the feedstuff of a hen and the blended product is fed to a hen.

Advantageous Effects of Invention

According to the present disclosure, a method for producing hen's egg in which at least one quality among an effect for improving yolk color, an effect for improving eggshell strength, an effect for increasing an egg white height, an effect for increasing an eggshell thickness, an effect for increasing an egg weight, an effect for increasing a Haugh unit, an effect for increasing an egg production ratio, and an effect for reducing the generation ratio of an abnormal egg is improved can be provided.

DESCRIPTION OF EMBODIMENTS

Hereinafter, the embodiment of the method for producing hen's egg improved in quality (hereinafter, simply referred to as the method for producing the hen's egg) will be described.

In the present disclosure, the solid-cultured product of the filamentous fungi is used as a quality improver for hen's egg. The quality of the hen's egg is improved by feeding the improver to a hen. The quality improver for hen's egg can be used by blending with the feedstuff of a hen or can be used alone. When the quality improver for hen's egg alone is fed to a hen without blending with the feedstuff or when the quality improver for hen's egg is blended with the feedstuff and the blended product is fed to a hen, a quality improving effect on hen's egg can be obtained. The feedstuff of a hen with which the quality improver for hen's egg is blended is not particularly limited and known feedstuffs may be used.

The blend ratio of the quality improver for hen's egg and the feedstuff is not particularly limited. However, blend of an excessive amount of the quality improver for hen's egg exhibits tendency in which the effect for improving the quality of hen's egg is saturated and thus increases the cost. As the blend ratio (%) of the quality improver for hen's egg, the quality improver for hen's egg is mixed with the feedstuff so as to be in a ratio of, for example, 0.1% by mass to 5.0% by mass, 0.1% by mass to 2.0% by mass, or 0.20% by mass to 1.5% by mass. This blend ratio allows the quality improvement effect for the hen's egg to be obtained. The quality improvement effect for hen's egg can be obtained even when the blend ratio of the quality improver for hen's egg is 0.1% by mass, which is a small blended ratio.

As the filamentous fungi, the fungi not producing mold poison are preferably used. Ingestion of the fungi not producing mold poison to a hen is safe. Examples of the filamentous fungi not producing mold poison include *Aspergillus oryzae, Aspergillus sojae*, or *Aspergillus luchuensis* that does not produce mold poison. As these filamentous fungi, seed fungi for the fermentation of fermented foods are commercially available or the filamentous fungi can be obtained at NITE Biological Resource Center (NBRC). The filamentous fungi may be a wild strain of which gene is not modified or may be filamentous fungi of which gene is modified by a gene technological method as described below.

Examples of the mold poison include aflatoxin, deoxynivalenol, ochratoxin, fumonisin, zearalenone, patulin, sterigmatocystin, and fusarium toxin.

The solid-cultured product of the filamentous fungi preferably includes polysaccharides constituting hyphae of the filamentous fungi. When the culture product including the polysaccharides and the filamentous fungi are fed together, improvement in the immune strength of a hen ingesting the culture product is expected. As a result, improvement in hen's egg quality is also expected.

The solid-cultured product of the filamentous fungi preferably includes an enzyme having activity. For example, when the solid-cultured product of the filamentous fungi includes an enzyme having activity, polymers included in the feedstuff can be degraded by mixing the solid-cultured product of the filamentous fungi with the feedstuff of a hen. This degradation action is performed outside the body of a hen and thus does not depend on the digestion ability of a hen. Therefore, this action does not place a load on a hen. When the enzyme having the activity is, for example, an enzyme that improves the digestion ratio of the feedstuff, nutrient contents are easily taken into the body of a hen by degrading the feedstuff with the enzyme outside the body of a hen. Although the detailed mechanism is unclear, it is presumed that the quality of the hen's egg is improved by easily taking the various nutrient contents into the body of the hen.

The solid-cultured product of the filamentous fungi preferably includes viable fungi of the filamentous fungi. For example, when the solid-cultured product of the filamentous fungi includes the viable fungi, the quality improver for hen's egg can be easily obtained by, for example, adding the culture substrate described below to the above culture product to perform secondary culture. According to this method, the quality improver for hen's egg can be remarkably easily obtained because the seed fungi are not required to be purchased.

For example, in the case where the enzyme is cellulase, pectinase, and the like, the degrading enzyme catalyzes the reaction in which cellulose, pectin, and the like included in the feedstuff or the like are degraded. Polysaccharides such as cellulose and pectin are a kind of the component constituting the cell walls of plants. Various kinds of the polysaccharides constituting the cell walls of plants have been known. The forms thereof are various and the constitutions are complex. In order to efficiently degrade the cell wall polysaccharide having complex structures, the degrading enzymes preferably act stepwise. For example, degradation efficiency of the cell walls of plant raw material included in the feedstuff is improved by degrading cellulose, pectin, and the like with the enzymes such as cellulase and pectinase. Consequently, the feedstuff becomes easily digested.

For example, in the case where the target degrading enzyme is tannase, tannase catalyzes the chemical reaction in which tannin included in the feedstuff or the like is degraded. Some types of tannin form complexes by strongly bonding to polymers such as proteins. Tannin may exist in the state of being intricately entangled with the components constituting the cell walls of plants and may inhibit degradation of the cell walls. Degradation of tannin with tannase improves the degradation efficiency of the cell walls of plant raw materials included in the feedstuff and thus the feedstuff becomes easily digested.

For example, in the case where the target degrading enzyme is phytase, phytase catalyzes the chemical reaction in which inorganic form phosphoric acid is separated from phytic acid included in the feedstuff and the like. It is said that phytic acid inhibits absorption of minerals such as calcium and zinc included in the feedstuff into the body of an animal ingesting the feedstuff. Therefore, degradation of phytic acid with phytase improves the absorption ratio of minerals. Phosphorous generated by degradation of phytic acid is also absorbed into the body of the animals ingesting the feedstuff.

Examples of the degrading enzyme include one or more enzymes selected from the group consisting of amylase, alkaline protease, acidic protease, neutral protease, xylanase, β-glucanase, cellulase, tannase, phytase, lactase, lipase, pectinase such as polygalac-turonase, a xylanase-pectinase complex enzyme, and a cellulase-protease-pectinase complex enzyme. Any of these enzymes are enzymes coded from the genomic DNA of the filamentous fungi and expressed from the filamentous fungi of the wild strain.

In order to form the culture product having the enzyme activity, the solid-cultured product of the filamentous fungi may be used as the quality improver for hen's egg without applying excessive heating to the culture product. The excessive heating refers to heating to the extent that the enzyme activity is lost. In order that the solid-cultured product includes the viable fungi of the filamentous fungi, the solid-cultured product of the filamentous fungi may be used as the quality improver for hen's egg without performing excessive heating to the extent that the filamentous fungi become extinct.

Genetic transformation may be performed so that the above enzyme is highly expressed in the filamentous fungi by using a known gene technological method. In the filamentous fungi, for example, it is known that the promoter of amylase (AmyB) or the promoter of enolase (enoA) have high expression amounts. A chimeric gene is obtained by bonding a gene that codes the target enzyme among the above enzymes and a terminator sequence corresponding to the promotor by using a known method to these promoters. When this chimeric gene is introduced to the filamentous fungi by a known method, the filamentous fungi in which the target enzyme is highly expressed can be obtained. The analysis of the genome sequence of the filamentous fungi has already finished and the sequence is published in a database. The sequences of the gene that codes the high expression promoter, the terminator, and the target enzyme are searched by using such a database and the primer is designed. The designed primer and a template such as cDNA and genomic DNA are used to amplify the desired gene sequence with PCR. The amplified gene sequence is used when conducting the genetic transformation. At the time of the genetic transformation, the above chimeric gene may be introduced at the target position of the genome by using a known genome editing method or the above chimeric gene may be introduced at any position of the genome by introducing the chimeric gene into the cells of the filamentous fungi. In order to selectively culture the genetically transformed filamentous fungi, known marker genes such as niaD and ptrA may be used.

At the time of cloning the highly expressing gene, the genomic DNA or cDNA of the filamentous fungi of the same species as the genetically transformed filamentous fungi is preferably used as the template. When the gene incorporated into the genetically transformed filamentous fungi is derived from the filamentous fungi belonging to the same species, safety of filamentous fungi is secured because a foreign gene is not incorporated. Such a cloning method is referred to as self-cloning. The method of the self-cloning employs, for example, a method in which the desired gene is cloned using the genomic DNA of the wild strain of the koji mold (*Aspergillus oryzae*, RIB40) obtainable at NBRC (National Institute of Technology and Evaluation) as the template and a method for introducing the cloned gene to a koji mold for sake brewing (*Aspergillus oryzae*, AOK11).

The solid-cultured product of the filamentous fungi can be obtained by, for example, the following method. The solid culture substrate described below is subjected to steaming and cooled. Seed fungi are inoculated to the cooled culture substrate. The inoculated culture substrate is placed on a culture bed in a culture apparatus and the culture is performed so that the filamentous fungi are propagated in the solid culture substrate by passing air in which temperature and humidity are controlled through between the grains of the culture substrate. The temperature of the air is not particularly limited. For example, the temperature is controlled in a range of 20° C. to 45° C. The humidity of the air is not particularly limited. For example, the humidity is controlled in a range of 50% to 99% in relative humidity.

When the filamentous fungi are cultured in a state of solid, more kinds of enzymes are produced as compared to the case where the filamentous fungi are cultured in a state of liquid and the production amount of individual enzyme also becomes larger. Therefore, when the product made by culturing the filamentous fungi in the state of solid is fed to a hen, the quality improvement effect of the hen's egg becomes higher as compared to the case where the product made by culturing the filamentous fungi in the state of liquid is fed to a hen. Common feedstuffs of a hen are solid in many cases. In the case of the liquid culture product of the filamentous fungi, liquid part of the feedstuff is increased when the culture product is mixed with the solid feedstuff. This may cause deterioration in a taste property for a hen. The solid-cultured product of the filamentous fungi does not cause such a problem, which is preferable.

The above culture substrate may be, for example, a solid organic substance suitable for the filamentous fungi to breed. The solid shall include, in addition to a solid content having hardness, a slurry-like substance or a power grain product. Examples of the substrate include one or more organic substances selected from the group consisting of cereals such as barleycorn, wheat, the bran of wheat, rice, beans, and corn; residues of processed food such as beet pulp, the squeezed lees of oil, and the squeezed lees of fermented foods; and food residue such as leftover foods. Examples of the squeezed lees of oil include the squeezed lees of soybean, the squeezed lees of rapeseed, the squeezed lees of sesame, and the squeezed lees of corn. Examples of the squeezed lees of the fermented foods include sake lees and soy sauce lees.

EXAMPLES

Hereinafter, the present invention will be described with reference to Examples of the method for producing the hen's egg improved in quality.

Example 1

To the bran of wheat (wheat bran), water was added and the resultant mixture was stirred, and thereafter the bran of wheat was subjected to steaming treatment under a condition of 0.2 MPa. The steamed bran of wheat was cooled down to around 30° C. A certain amount of the seed fungi of *Aspergillus oryzae* (AOK11) that is commercially available as a koji mold for sake brewing and does not produce mold poison was inoculated and the resultant mixture was mixed so as to be uniform. The water content of the bran of wheat at the time of inoculation was set to 60%. The culture was started after this raw material was accumulated on the culture bed in the culture apparatus and smoothed so that the thickness of the accumulated raw material was constant. During the culture, air in which temperature and humidity were controlled was fed to the accumulated raw material and the fed air was passed through between the grains of the raw material. At this time, the temperature of the fed air was controlled to 25° C. to 40° C. and the relative humidity of the fed air was controlled to 90% to 96% so that the substance temperature of the raw material is in a range of 30° C. to 38° C. During the culture, the raw material was stirred using a stirring unit equipped with the culture apparatus. The culture was performed until hyphae covered the surface of the grains of the bran of wheat. This solid culture product was determined to be the quality improver for hen's egg according to Example 1 without reducing the fungi by heating or the like. This quality improver for hen's egg includes the viable fungi of *Aspergillus oryzae* (AOK11) and includes useful enzymes of *Aspergillus oryzae* (AOK11) retaining enzyme activity.

The culture product of the solid bran of wheat was obtained in the same manner as the manner in Example 1 except that *Aspergillus oryzae* (AOK11) that highly expressed tannase (tanA), pectin lyase (pelA) that is a kind of pectinase, phytase (phyA), and polygalac-turonase (pgaB) that is a kind of pectinase was used as the seed fungi. This solid culture product was determined to be the quality improver for hen's egg according to Example 2 without reducing the fungi by heating or the like. Similar to Example 1, this quality improver for hen's egg includes the viable fungi and retains enzyme activity. The transformant of *Aspergillus oryzae* (AOK11) has been deposited with the accession number NITE BP-04193 on Oct. 31, 2024 at NITE Patent Microorganisms Depositary, National Institute of Technology and Evaluation. The address of the depository is #122, 2-5-8 Kazusakamatari, Kisarazu-shi, Chiba 292-0818, Japan. The BUDAPEST TREATY ON THE INTERNATIONAL RECOGNITION OF THE DEPOSIT OF MICROORGANISMS FOR THE PURPOSES OF PATENT PROCEDURE RECEIPT IN THE CASE OF AN ORIGINAL DEPOSIT issued pursuant to Rule 7.1 by the INTERNATIONAL DEPOSITARY AUTHORITY certified that the microorganism identified with the accession number NITE BP-04193 was accompanied by a scientific description and a proposed taxonomic designation. The BUDAPEST TREATY ON THE INTERNATIONAL RECOGNITION OF THE DEPOSIT OF MICROORGANISMS FOR THE PURPOSES OF PATENT PROCEDURE VIABILITY STATEMENT issued pursuant to Rule 10.2 by the INTERNATIONAL DEPOSITARY AUTHORITY certified that the viability of the microorganism identified with the accession number NITE BP-04193 was tested on Nov. 5, 2024, and on that date, the said microorganism was viable.

The target genes of tannase (tanA), pectin lyase (pelA), phytase (phyA), or polygalac-turonase (pgaB) were incorporated to *Aspergillus oryzae* (AOK11) by known methods to perform the genetic transformation. At the time of cloning the target genes, the genomic DNA of *Aspergillus oryzae* (RIB40) was used as the template. Each of the target genes described above was incorporated between the amylase promoter (AmyB promoter) sequence and the amylase terminator (AmyB terminator) sequence that are high expression promoters. These gene sequence can be searched using a koji mold genome database (www.aspgd.org/) and the database of glycosyl hydrolase CAZy (www.cazy.org/fam/acc_GH.html).

[Effect on Hens in Latter Period of Egg Production]

To 325-day old hens (Boris Brown) in the latter period of egg production, products made by mixing each of the quality improvers for hen's egg in Example 1 and Example 2 and the feedstuff were fed for 24 days (a feeding period). The effect on the quality of the eggs collected during this period was examined. For comparison, the feedstuff alone was fed for the same period and the effect on the quality of eggs collected during this period was examined in the same manner (Comparative Example 1). The examined quality was the effects on eggshell color, yolk color, eggshell strength (strength of an eggshell), an egg white height, an eggshell thickness (a thickness of an eggshell), an egg weight, a Haugh unit, and an egg production ratio. When blending each of the quality improvers for hen's egg and the feedstuff, each of the blend ratios of the quality improver for hen's egg was set to 0.25% by mass, 0.5% by mass, and 1.0% by mass as listed in Table 1.

A group of hens to which the sample in which the quality improver for hen's egg of Example 1 was blended in 0.25% by mass was fed was referred to as Experimental Section 1, and a group of hens to which the sample in which the quality improver for hen's egg of Example 1 was blended in 0.5% by mass was fed was referred to as Experimental Section 2 as listed in Table 1. Similarly, the experimental sections were set up to Experimental Section 7 as listed in Table 1. Five 325-day old hens in the latter period of egg production belonged to each of the experimental sections.

The blend ratio of the quality improver for hen's egg is in accordance with the following formula. As the feedstuff, feedstuff manufactured by Nishinihon Feed Co., Ltd. (trade name: Gold 18) containing 52% by mass of cereals, 27% by mass of vegetable oil lees, and 15% by mass of other components was used. Methods for individual tests were as follows:

Blend ratio of quality improver for hen's egg (% by mass)=[Mass of quality improver for hen's egg/ (Mass of quality improver for hen's egg+Mass of feedstuff)]×100

[Eggshell Color]

The closest color number to the eggshell color was recorded using Shell Color Fan manufactured by GHEN Corporation. The color number is 1 to 10. Eggs were collected for 3 days in total during the feeding period. One egg per day was collected from each of the experimental sections. For each of the experimental sections, the average value of the eggshell color was determined from the measured values of three eggs in total. The results are listed in Table 1.

[Yolk Color]

The closest color number to the yolk color was recorded using Yolk Color Fan manufactured by Hoffmann-La Roche & Co. Ltd. The color number is 1 to 15. Eggs were collected for 3 days in total during the feeding period. One egg per day was collected from each of the experimental sections. For each of the experimental sections, the average value of the yolk color was determined from the measured values of three eggs in total. The results are listed in Table 1.

[Eggshell Strength]

A pressure at the time of generating a crack in the eggshell was measured by applying pressure (kg/cm$^2$) to an egg using a fracture-by-pressure method. As the pressure application, force was applied along the long axis direction of the egg. Eggs were collected for 3 days in total during the feeding period. One egg per day was collected from each of the experimental sections. For each of the experimental sections, the average value of the eggshell strength was determined from the measured values of three eggs in total. The results are listed in Table 1.

[Egg White Height]

The egg white height is a value obtained by measuring the height (mm) of thick egg white when the eggshell was cracked and the egg was statically placed in a flat plate state. Eggs were collected for 3 days in total during the feeding period. One egg per day was collected from each of the experimental sections. For each of the experimental sections, the average value of the egg white height was determined from the measured values of three eggs in total. The results are listed in Table 1.

[Eggshell Thickness]

A thickness of a piece of the eggshell from which the eggshell membrane was peeled off was measured using an eggshell thickness meter. At the time of the measurement, the thickness of the equator part of the egg was measured. Eggs were collected for 3 days in total during the feeding period. One egg per day was collected from each of the experimental sections. For each of the experimental sections, the average value of the eggshell thickness was determined from the measured values of three eggs in total. The results are listed in Table 1.

[Egg Weight]

The mass (g) of eggs with eggshell was measured. Eggs were collected for 3 days in total during the feeding period. One egg per day was collected from each of the experimental sections. For each of the experimental sections, the average value of the egg weight was determined from the measured values of three eggs in total. The results are listed in Table 1.

[Haugh Unit]

Eggs were collected for 3 days in total during the feeding period. One egg per day was collected from each of the experimental sections. The thick egg white height and the egg weight were recorded in each of the egg collection days and each of the experimental sections. Haugh unit was determined in accordance with the following formula using these recorded values. Haugh unit is one indicator indicating the freshness of hen's egg. As the value is larger, the freshness is better. The average value was determined from the values of the determined three-times $$\text{Haugh unit(HU)} = 100\log\left(H - \frac{\sqrt{G}\,(30W^{0.37} - 100)}{100} + 1.9\right)$$

H: Thick egg white height
G: 32.2 (a constant)
W: Egg weight (g)

[Egg Production Ratio]

Each of the experimental sections was determined to be one group and the egg production ratio was determined. The egg production ratio is a value obtained by dividing the number of produced eggs of the group in a certain period by the cumulative total number of hens.

Specifically, the egg production ratio was determined in accordance with the following formula.

Egg production ratio (%)=Number of produced eggs in period/cumulative total number of hens in period×100

The period when the egg production ratio was examined is arbitrary 10 days in the above feeding period and the number of hens is the number of hens living during the period when the egg production ratio was examined, that is, five.

TABLE 1

| | | Blend ratio (% by mass) | Eggshell color | Yolk color | Eggshell strength (kgf) |
|---|---|---|---|---|---|
| Experimental Section 1 | Example 1 | 0.25 | 9.3 | 13.3 | 2.6 |
| Experimental Section 2 | Example 1 | 0.5 | 9.3 | 13.3 | 2.9 |
| Experimental Section 3 | Example 1 | 1.0 | 9.7 | 13.3 | 2.9 |
| Experimental Section 4 | Example 2 | 0.25 | 10.0 | 13.0 | 3.3 |
| Experimental Section 5 | Example 2 | 0.5 | 8.7 | 13.0 | 3.3 |
| Experimental Section 6 | Example 2 | 1.0 | 9.3 | 13.0 | 2.9 |
| Experimental Section 7 | Comparative Example 1 | 0 | 9.3 | 13.0 | 2.5 |

| | | Egg white height (mm) | Eggshell thickness (mm) | Egg weight (g) | HU | Egg production ratio (%) |
|---|---|---|---|---|---|---|
| Experimental Section 1 | Example 1 | 8.9 | 0.39 | 65.0 | 93.1 | 84 |
| Experimental Section 2 | Example 1 | 8.5 | 0.33 | 67.3 | 89.8 | 96 |
| Experimental Section 3 | Example 1 | 8.6 | 0.39 | 63.3 | 91.7 | 92 |
| Experimental Section 4 | Example 2 | 7.5 | 0.42 | 68.8 | 84.5 | 96 |
| Experimental Section 5 | Example 2 | 9.0 | 0.41 | 67.2 | 93.0 | 92 |
| Experimental Section 6 | Example 2 | 9.3 | 0.38 | 69.0 | 94.1 | 92 |
| Experimental Section 7 | Comparative Example 1 | 8.2 | 0.34 | 67.3 | 90.2 | 90 |

As listed in Table 1, as compared to the hens of Experimental Section 7 to which the feedstuff of Comparative Example 1 was fed, some of the hens of Experimental Section 1 to Experimental Section 6 in the latter period of egg production to which the feedstuff of Example 1 or Example 2 was fed improved the quality of the eggs of the yolk color, the eggshell strength, the egg white height, the eggshell thickness, the egg weight, and the Haugh unit. Some of the hens of Experimental Section 1 to Experimental Section 6 also improved the egg production ratio. In particular, for the eggshell strength, Experimental Section 1 to Experimental Section 6 according to all Examples exhibited the quality improvement effect as compared to the Experimental Section 7 according to Comparative Example 1.

[Effect on Hens in Last Period of Egg Production]

To 425-day old hens (Boris Brown) in the last period of egg production, products made by mixing each of the quality improvers for hen's egg in Example 1 and Example 2 and the feedstuff were fed for 30 days (a feeding period). The effect on the quality of the eggs collected during this period was examined. For comparison, the feedstuff alone was fed for the same period and the effect on the quality of eggs collected during this period was examined in the same manner (Comparative Example 1). The examined quality was the eggshell color, the yolk color, the eggshell strength (the strength of an eggshell), the egg white height, the eggshell thickness (the thickness of an eggshell), the egg weight, the Haugh unit, the egg production ratio, and a generation ratio of abnormal eggs. At the time of blending each of the quality improvers for hen's egg and the feedstuff, each of the blend ratios of the quality improver for hen's egg was set to 0.25% by mass, 0.5% by mass, and 1.0% by mass as listed in Table 2. The composition of the feedstuff and each of the test methods are the same as the above composition and methods in principal. However, the eggs were collected five times in total during the feeding period except the tests of the egg production ratio and the abnormal egg ratio, and one egg is collected per day from each of the experimental sections. The test method for the egg production ratio and the test method for the generation ratio of abnormal eggs were as follows. The results are listed in Table 2.

A group of hens to which the sample in which the quality improver for hen's egg of Example 1 was blended in 0.25% by mass was fed was referred to as Experimental Section 8, and a group of hens to which the sample in which the quality improver for hen's egg of Example 1 was blended in 0.5% by mass was fed was referred to as Experimental Section 9 as listed in Table 2. Similarly, the experimental sections were set up to Experimental Section 14 as listed in Table 2. Four 425-day old hens in the last period of egg production belonged to each of the experimental sections.

[Egg Production Ratio]

Each of the experimental sections was determined to be one group and the egg production ratio was determined. The egg production ratio is a value obtained by dividing the number of produced eggs of the group in a certain period by the cumulative total number of hens. Specifically, the egg production ratio was determined in accordance with the following formula.

Egg production ratio (%)=Number of produced eggs in period/cumulative total number of hens in period×100

The period when the egg production ratio was examined is arbitrary 10 days in the above feeding period and the number of hens is the number of hens living during the period when the egg production ratio was examined, that is, four.

[Abnormal Egg Ratio]

For each of the experimental sections, a period was set and the number of the produced eggs during the set period and the number of the abnormal eggs during the set period were determined. The abnormal egg ratio was determined in accordance with the following formula. The period during which the abnormal eggs were examined is an arbitrary 10 days in the above feeding period.

Abnormal egg ratio (%)=Number of abnormal eggs during period/Number of produced eggs during period×100

Determination of an abnormal egg or a normal egg was carried out by visual observation and examination by touch at the time of egg collection. The criteria for determining the abnormal egg are as follows. In the case where any one of the following criteria applied, the egg was determined to be the abnormal egg.
1. Roughness exists on the eggshell surface.
2. Color unevenness exists on the eggshell surface.
3. The eggshell surface is broken or a crack is generated.
4. The eggshell does not exist due to eggshell formation failure and the egg is in a state of being covered with an eggshell membrane.
5. The egg has a significantly distorted shape.
6. The color of the eggshell is remarkably white (three or less in terms of a SCF value).

As listed in Table 2, as compared to the hens of Experimental Section 14 to which the feedstuff of Comparative Example 1 was fed, some of the hens of Experimental Section 8 to Experimental Section 13 in the last period of egg production to which the feedstuff of Example 1 or Example 2 was fed improved the quality of the eggs for the yolk color, the eggshell strength, the egg white height, the eggshell thickness, the egg weight, the Haugh unit, and the egg production ratio. It is also found that the generation ratio of the abnormal eggs is lowered. In particular, for the eggshell strength, the egg white height, the Haugh unit, and the abnormal egg ratio, Experimental Section 8 to Experimental Section 13 according to all Examples exhibited the quality improvement effect as compared to the Experimental Section 14 according to Comparative Example 1.

As described above, according to the present disclosure, the method for producing hen's egg for which at least one quality among the improvement in the yolk color, the improvement in the eggshell strength, the increase in the egg white height, the increase in the eggshell thickness, the increase in the egg weight, the increase in the Haugh unit, the increase in the egg production ratio, and the reduction in the generation ratio of the abnormal egg is improved can be provided.

The invention claimed is:
1. A method for producing hen's egg improved in quality, the method comprising:
feeding a solid-cultured product of filamentous fungi blended with feedstuff of a hen to improve quality of the hen's egg, wherein
the hen is a laying hen that is 325-day old to 455-day old,

TABLE 2

| | | Blend ratio (% by mass) | Eggshell color | Yolk color | Eggshell strength (kgf) | Egg white height (mm) |
|---|---|---|---|---|---|---|
| Experimental Section 8 | Example 1 | 0.25 | 8.2 | 14.0 | 2.9 | 11.7 |
| Experimental Section 9 | Example 1 | 0.5 | 9.2 | 14.4 | 3.7 | 10.9 |
| Experimental Section 10 | Example 1 | 1.0 | 9.0 | 13.8 | 3.8 | 11.1 |
| Experimental Section 11 | Example 2 | 0.25 | 9.0 | 13.6 | 3.5 | 10.8 |
| Experimental Section 12 | Example 2 | 0.5 | 9.2 | 13.6 | 3.0 | 11.1 |
| Experimental Section 13 | Example 2 | 1.0 | 9.2 | 14.4 | 3.8 | 10.5 |
| Experimental Section 14 | Comparative Example 1 | 0 | 9.0 | 13.8 | 2.6 | 10.2 |

| | | Eggshell thickness (mm) | Egg weight (g) | HU | Egg production ratio (%) | Abnormal egg ratio (%) |
|---|---|---|---|---|---|---|
| Experimental Section 8 | Example 1 | 0.36 | 64.5 | 105.4 | 100 | 45.0 |
| Experimental Section 9 | Example 1 | 0.44 | 70.3 | 101.4 | 75 | 38.3 |
| Experimental Section 10 | Example 1 | 0.39 | 70.7 | 101.9 | 94 | 13.5 |
| Experimental Section 11 | Example 2 | 0.42 | 62.6 | 102.1 | 93 | 27.5 |
| Experimental Section 12 | Example 2 | 0.44 | 67.7 | 103.1 | 73 | 24.1 |
| Experimental Section 13 | Example 2 | 0.41 | 66.5 | 100.1 | 85 | 37.5 |
| Experimental Section 14 | Comparative Example 1 | 0.40 | 69.7 | 98.8 | 98 | 46.6 | the filamentous fungi is a transformant of *Aspergillus oryzae* (AOK11) that is genetically manipulated so that tannase (tanA), phytase (phyA), pectin lyase (pelA), and polygalac-turonase (pgaB), are expressed, and quality of hen's egg, which is egg shell strength or reduction in a generation ratio of an abnormal egg, is improved for the hen's egg that the laying hen that is 325-day old to 455-day old ingesting the solid-cultured product of the filamentous fungi produce, the method is for improving quality of the eggs by feeding the solid-cultured product of the filamentous fungi by blending the solid-cultured product of the filamentous fungi with the feedstuff of a hen; and a blend ratio of the solid-cultured product of the filamentous fungi with the feedstuff is 0.1% by mass to 5.0% by mass.

2. The method for producing hen's egg improved in quality according to claim 1, wherein the filamentous fungi are fungi not producing mold poison.

3. The method for producing hen's egg improved in quality according to claim 1, wherein the solid-cultured product of the filamentous fungi comprises polysaccharides constituting hyphae of the filamentous fungi.

4. The method for producing hen's egg improved in quality according to claim 1, wherein the solid-cultured product of the filamentous fungi comprises an enzyme having activity.

5. The method for producing hen's egg improved in quality according to claim 1, wherein the solid-cultured product of the filamentous fungi comprises viable fungi of the filamentous fungi.

\* \* \* \* \*